(No Model.)

D. L. SMITH.
ROTARY STEAM ENGINE.

No. 284,681.      Patented Sept. 11, 1883.

Witnesses.
H. D. Vincent
N. H. Vincent

Inventor.
David L. Smith

UNITED STATES PATENT OFFICE.

DAVID L. SMITH, OF BIG RAPIDS, MICHIGAN, ASSIGNOR TO HIMSELF AND NATHAN H. VINCENT, OF SAME PLACE.

ROTARY STEAM-ENGINE.

SPECIFICATION forming part of Letters Patent No. 284,681, dated September 11, 1883.

Application filed January 5, 1883. (No model.)

*To all whom it may concern:*

Be it known that I, DAVID L. SMITH, a citizen of the United States, residing at the city of Big Rapids, in the county of Mecosta and State of Michigan, have invented a new and Improved Form of Rotary Steam-Engine, of which the following is a specification.

My invention relates to improvements in rotary steam-engines in which rotating cylinders operate inside and in conjunction with a shell or shells; and the objects of my improvements are, first, to provide a cylinder-head and secure a more economical use of steam, and, second, facilities for proper adjustment of the parts. I attain these objects by the mechanism illustrated in the accompanying drawings, in which—

Figure 1:
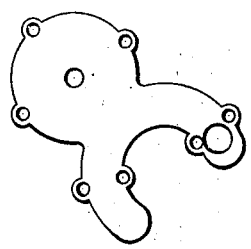
Figure 1:
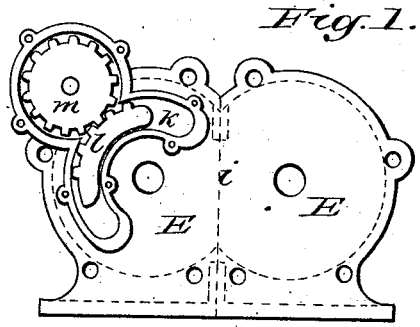
Figure 2:
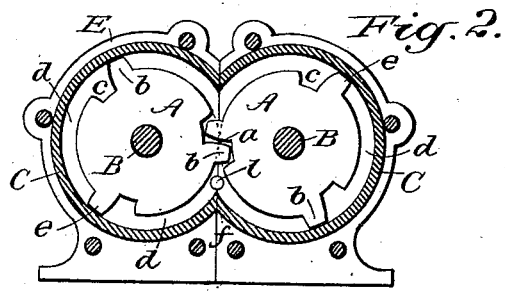
Figure 3:
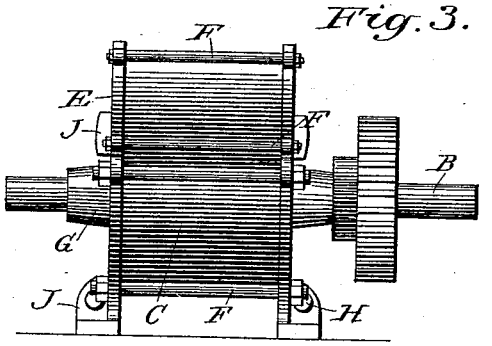

Figure 1 is an end-view with the cap removed from the hood, showing convenient induction-port $k$ through the head E, for the admission of steam to the spaces $d\ d\ d$, passing through the ends of the recesses $c\ c\ c$, with the expansion-valve $l$ for opening and closing the port $k$, operated by means of geared wheel $m$ and lever attached. Fig. 2 is a sectional elevation as it appears with the head removed, showing the interior parts as adjusted inside of the shell; Fig. 3, a side elevation, showing the heads with their hubs or bosses with shafts passing through them, with gear outside of shell, and also the bolts which hold the heads in their positions on the shell. Fig. 4 is an end view, showing perpendicular joint in the center for adjustment, which is also shown in Figs. 1 and 2, with bolts for fastening the two sections of the heads together.

Similar letters refer to similar parts throughout the several views.

In Fig. 2 is shown the cylinders A A, which are keyed to their shafts B B, adjusted inside of the shell C C, with their faces together at $a$, the point of contact therebetween, at point $a$ forming a steam-tight joint, and their faces act as a cylinder-head, as referred to in claim 1. The cylinders are each provided with corresponding cogs, $b\ b\ b\ b\ b$, and their recesses $c\ c\ c\ c\ c$, dividing their respective faces into equal spaces, $d\ d\ d\ d\ d\ d$, the cogs projecting far enough to exactly fill the spaces between the faces of the cylinders and the inner face of the shell, the points of contact therebetween at $e\ e$, Fig. 2, also forming steam-tight joints, and when under steam-pressure the cogs act as pistons, which are faced down to a ground joint where they come in contact while passing each other, meeting at their bases, when the peripheries of the cylinders part contact in front, and maintain the joint until the said peripheries again meet in their rear, passing each other without producing any shock or strain, supplying the cylinders with a requisite for that portion of their faces occupied by the pistons and recesses, and reducing the back-pressure to an inconsiderable minutia. By the use of three or more pistons I greatly economize in the use of steam by cutting off three times every revolution, which saves condensation and secures its full expansive force without incurring any waste. I attain these results by admitting the steam to the steam chamber or spaces $d\ d$, &c., through the ends of the recesses $c\ c\ c$ by means of a convenient port, $k$, through the head E, the amount of steam admitted through the port $k$ being regulated by means of a valve conforming to the dimensions of the port, operated by geared wheel and lever inside of a hood cast upon the outside of the head, as shown in Fig. 1. The recesses $c\ c$, &c., are provided for the purpose of receiving the cogs as they rotate past the center or point of contact of the cylinders at point $a$. The cylinders are governed and their power united when under steam-pressure by means of gearing attached to shafts B B, outside of head E, as shown in Fig. 3.

The shell C C comprises two hollow cylindrical parts accurately bored out, and properly faced on the inside, joined together at $f\ f$, Fig. 2, whose chord-line passes directly through the point of contact of the cylinders at point $a$.

The heads E E are provided with bosses $g\ g$, as shown in Fig. 3, which are bearings for the shafts B B, and are also provided with grooves, in which the ends of the shell C C, Fig. 2, are inserted to such a point that the inner faces of the heads form working contact with the ends of the cylinders A A, and are held firmly to their places by the bolts F F, &c., as shown in Fig. 3.

The joint *i*, Fig. 1, divides the engine in two sections at the point of contact of the peripheries of the cylinders at *a*, and is opened and closed by sliding the disconnected section back and forth on the bed-plate, exposing to view and rendering ready access to all the interior parts for the purposes of adjustment or otherwise, so that the pistons *b b b* can be repacked in a moment's time without disturbing or throwing out of line the connected section, or that portion of the engine furnishing the motive power, and furnishes a ready means by which the joint *a* can be adjusted in case of wear or otherwise, and thus maintain a steam-tight joint at *a* for a cylinder-head.

The flanges *j j* on the heads, Fig. 3, are for the purpose of uniting and holding the two sections in their respective positions by means of bolts H H, &c., as shown in Figs. 3 and 4.

The steam is applied to the cylinders by means of a convenient part or parts, *k*, Fig. 1, filling the first spaces, *d d*, Fig. 2, and acting directly with full pressure upon exposed pistons *b b*, causing the cylinders to rotate in opposite directions until the following set of pistons cut off the steam by coming in contact with the shell and receive a like pressure, and so on, thus producing one continuous propelling motion. The steam, after being cut off by the pistons coming in contact with the shell, as aforesaid, is carried around as the cylinders rotate, acting as a self-packing for the pistons, at the same time maintaining a continuous pressure toward the center or point of contact of the cylinders, and materially aiding in maintaining the steam-tight joint until it reaches the exhaust at port, or it may be compounded, and a large percentage of its power saved and utilized a second time by inserting pipes, so as to take the steam from the spaces *d d d* after being so cut off before it reaches the exhaust-port, and conducting it to another engine handy by, without interfering with or reducing the power of its original application. The steam is exhausted through a port underneath the cylinders, which port is hidden from view in the drawings by the bed-plate.

What I claim, and desire to secure by Letters Patent as my invention, is—

1. The cylinder-head, formed by placing longitudinally together the faces of two or more cylinders operated inside of a shell, in combination with the pistons *b b b*, their recesses *c c c*, the induction-port *k*, and the expansion-valve *l*, which unite to control and regulate the steam, admitting to the steam-chamber *d d d* such quantities of steam only as may be needed to produce the power required, securing and utilizing its expansive power, and cutting off so rapidly that condensation is avoided, and the adjustable joint *i* for packing the pistons and maintaining a steam-tight joint in the cylinder-head.

2. The joint *i*, for the purposes of a take-up or adjustment, and, in combination with the faces or peripheries of the cylinders, maintaining a steam-tight joint at *a* for a cylinder-head, and packing the pistons *b b b*, substantially as set forth.

DAVID L. SMITH.

Witnesses:
C. W. NOTTINGHAM,
N. H. VINCENT.